United States Patent
Yamazaki (10) Patent No.: US 7,083,751 B2
(45) Date of Patent: Aug. 1, 2006

(54) METHOD FOR FORMING SOLIDIFIED GRANULAR MATERIALS

(75) Inventor: Shouji Yamazaki, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/508,889

(22) PCT Filed: Mar. 25, 2003

(86) PCT No.: PCT/JP03/03582

§ 371 (c)(1),
(2), (4) Date: Sep. 23, 2004

(87) PCT Pub. No.: WO03/080314

PCT Pub. Date: Oct. 2, 2003

(65) Prior Publication Data

US 2005/0127547 A1   Jun. 16, 2005

(30) Foreign Application Priority Data

Mar. 26, 2002 (JP) .............................. 2002-087061

(51) Int. Cl.
*B29C 44/12* (2006.01)
(52) U.S. Cl. .................. 264/45.3; 264/51; 264/112; 264/122
(58) Field of Classification Search .................. None
See application file for complete search history.

(56) References Cited

U.S. PATENT DOCUMENTS

| | | | |
|---|---|---|---|
| 3,832,429 A * | 8/1974 | Charpentier | ................ 264/51 |
| 4,610,836 A | 9/1986 | Wycech | |
| 4,695,343 A | 9/1987 | Wycech | |
| 4,751,249 A | 6/1988 | Wyceck | |
| 5,266,396 A | 11/1993 | Howard | |

OTHER PUBLICATIONS

WO 93/05103, Strengthening Structures, Publication Date: Mar. 18, 1993.

* cited by examiner

*Primary Examiner*—Mary Lynn Theisen
(74) *Attorney, Agent, or Firm*—Rankin, Hill, Porter & Clark LLP (57) ABSTRACT

A method for forming a solidified granular material (15), in which granules (16, 17) are charged into a tubular frame member (11) and then heated together with the frame member, to solidify the granules. The granules include a mixture of first granules (16) and second granules (17), each of which second granules has a thermoplastic resin shell enclosing a solid or liquid which expands by vaporization. The mixture is charged into the frame member and heated together with the frame member. The heating causes the second granules (17) to expand and the surfaces of the second granules to melt for bonding with the first granules (16). The mixture, upon cooling, becomes a solidified granular material (15), filling the frame member with no space therebetween.

3 Claims, 11 Drawing Sheets

METHOD FOR FORMING SOLIDIFIED GRANULAR MATERIALS

TECHNICAL FIELD

The present invention relates to a method for forming a solidified powdery or particulate material (hereinafter referred to as a granular material) with which to fill a tubular frame member for efficiently absorbing impact energy applied to the frame member.

BACKGROUND ART

Known methods of forming a solidified granular material to be inserted into a tubular frame member for reinforcement include, for example, ① U.S. Pat. No. 4,610,836 "METHOD OF REINFORCING A STRUCTURAL MEMBER" (hereinafter referred to as Prior Art 1), ② art of solidifying granular materials with a resin material (hereinafter referred to as Prior Art 2), ③ art of solidifying granular materials with a bridging liquid film (hereinafter referred to as Prior Art 3), and ④ art of solidifying granular materials by themselves (hereinafter referred to as Prior Art 4).

In FIG. 2 of the official publication of Prior Art 1, there is disclosed a structure in which a frame member is filled with adhesive-coated glass microspheres which are enveloped with a fiberglass cloth. U.S. Pat. No. 4,695,343 also discloses a similar structure.

Prior Art 2 will be described with reference to FIGS. 13 and 14 hereof.

Figure 13:
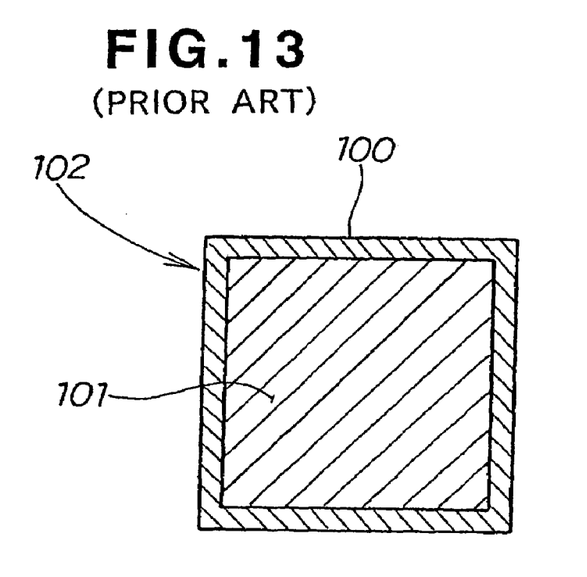
FIG. 13 is a cross-sectional view of a structural member with its frame member filled with a conventional solidified granular material.

FIG. 13 illustrates a structural member 102 with a frame member 100 filled with a solidified granular material 101.

Figure 14:
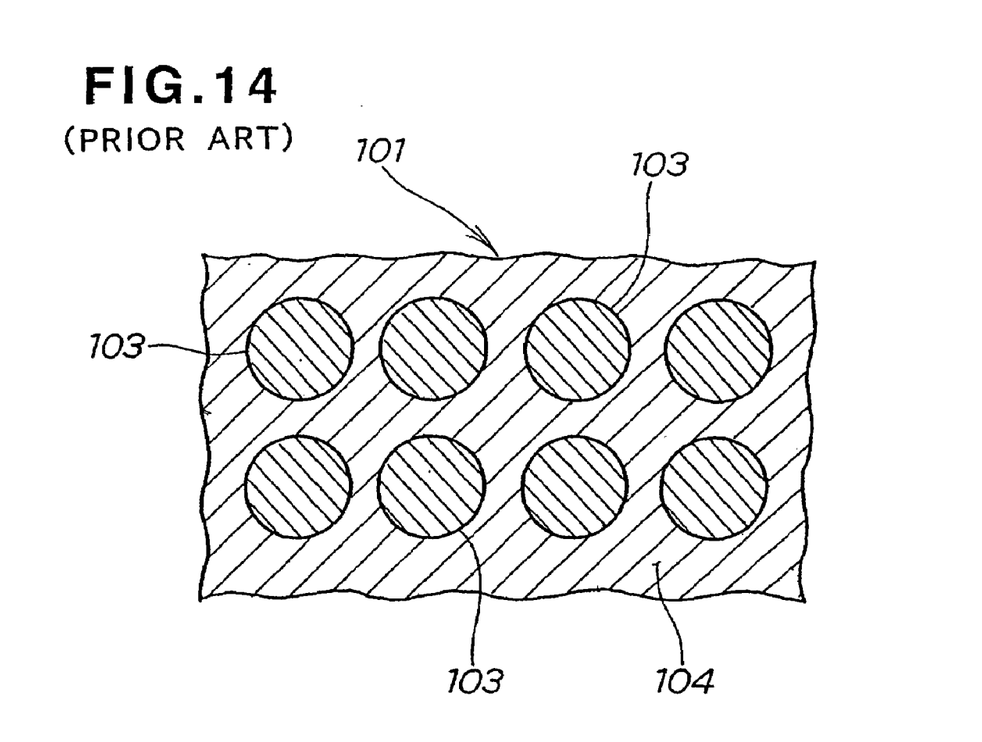
FIG. 14 is an enlarged cross-sectional view of a conventional solidified granular material with granules solidified with a resin material.

The solidified granular material 101 shown in FIG. 14 consists of granules 103 and a resin material 104 filled between the granules 103 to solidify the granules 103.

Prior Art 3 will be described with reference to FIG. 15.

Figure 15:
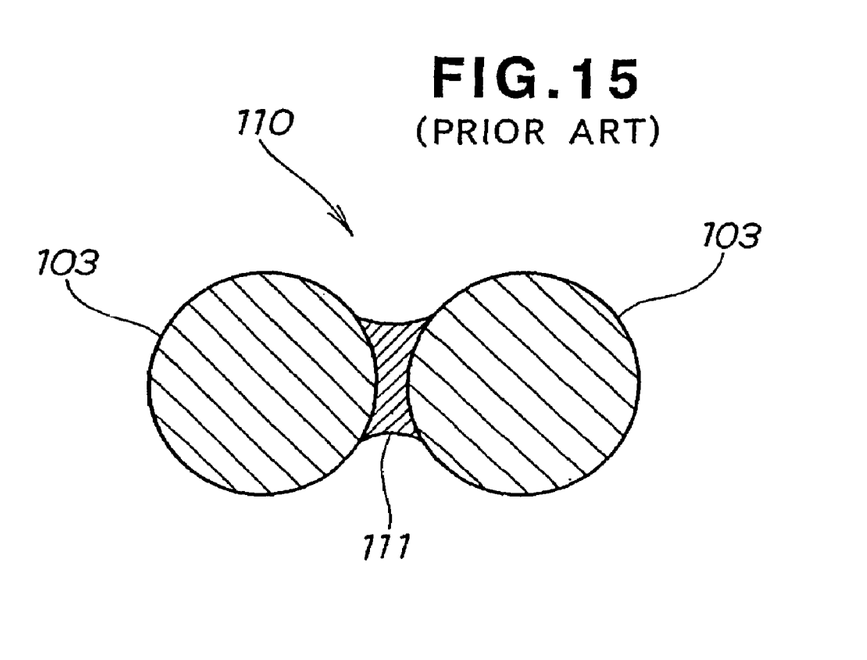
FIG. 15 is an enlarged partial cross-sectional view of a conventional solidified granular material with adjacent granules bonded together with a bridging liquid film.

A solidified granular material 110 shown in FIG. 15 has a structure in which adjacent granules 103 are bonded together with a bridging liquid film 111. The bonded structure is made by dampening the granules 103 with water or the like and then pressurizing and heating them to form the bridging liquid film 111, thereby forming the solidified granular material 110.

Figure 16:
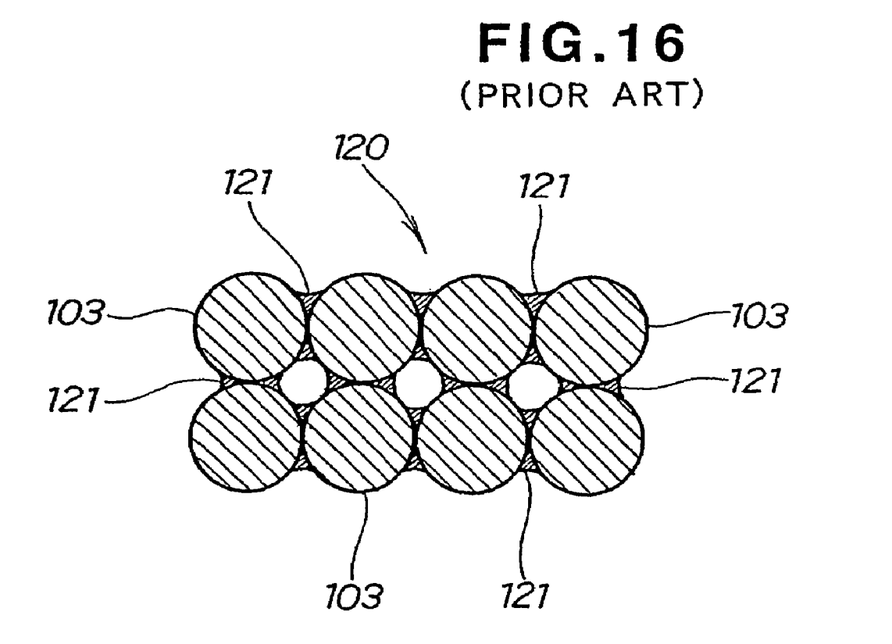
FIG. 16 is a cross-sectional view of a conventional solidified granular material with granules bonded together by melting the surfaces of the granules.

A solidified granular material 120 shown in FIG. 16 is made by surface-melting granules 103 to bond the granules 103 together. Reference numeral 121 denotes a solid portion of the surfaces of the granules 103 solidified after the melting.

The solidified granular material in Prior Art 1 forms a solid matter having high rigidity in its entirety because the microspheres are bonded together with the adhesive. However, when an impact is applied to the frame member, for example, small deformation of each microsphere significantly increases the load developed at the frame member, resulting in insufficient absorption of the impact energy.

In Prior Art 2, as shown in FIGS. 13 and 14, the granules 103 are solidified with the resin material 104 to increase the rigidity of the structural member 102. The increased amount of the resin material 104, however, increases the weight of the structural member 102.

In Prior Art 3, in FIG. 15, the bonding of the granules 103 using the bridging liquid film 111 depends on the surface tension, which provides small binding force, making it difficult to form a large solidified granular material 110.

In Prior Art 4, in FIG. 16, the solidification by the surface-melting of the granules 103 themselves provides strong connection between the adjacent granules 103. However, when the granules 103 are ceramics such as glass, silicon dioxide ($SiO_2$) or aluminum oxide ($Al_2O_3$: alumina), it is necessary to heat the granules 103 at a very high temperature, requiring additional equipment such as a heating apparatus, and making it difficult to form a solidified granular material 120.

Further, in Prior Arts 1 to 4, to insert granules into a frame member after solidifying them, it is required to previously make the dimension of the solidified granular material match the inside dimension of the frame member using a solidification mold or the like. Thus, required is an additional production step of forming a solidified granular material.

Furthermore, even when granules are solidified after charged into a frame member, it can be difficult, depending on the shape of the frame member, to charge the granules into the frame member in close relationships, resulting in needless space therebetween.

It is thus required to allow a frame member charged with a solidified granular material to efficiently absorb a greater impact energy and to facilitate the formation of a solidified granular material of light weight and large size therein with no space therebetween without additional equipment and an additional production step.

BRIEF SUMMARY OF THE INVENTION

According to an aspect of the present invention, there is provided a method for forming a solidified granular material with granules bonded into a solid form, in a space within a frame member and/or a space enclosed by the frame member and a surrounding panel member, the method comprising the steps of: mixing first granules and second granules together, each of the second granules having a thermoplastic resin shell enclosing a solid or liquid which expands by vaporization; charging the mixture of the first and second granules into the frame member; and heating the first granules and the second granules together with the frame member so as to soften the second granules and make the same expand by internal pressures, as well as to melt surfaces of the second granules for bonding with the first granules.

Preferably, the method further comprises, after the heating step, the step of cooling the first granules and the second granules together with the frame member.

Desirably, the solid or liquid which expands by vaporization comprises a hydrocarbon of low meting point.

Thus, in the present invention, since the solidified granular material is formed with the second granules greatly expanded by heating, the frame member can be filled with the solidified granular material with no space left therebetween.

Further, since only charging the first granules and the second granules into the frame member and heating them allow the formation of the solidified granular material, the solidified granular material can be easily formed without the need for an additional production mold or an additional production step which is required for forming a solidified granular material using a mold or the like for solidifying granules. Further, the fact that the surfaces of the second granules can be melted at a low temperature eliminates the need for an additional heating apparatus or the like, increasing productivity.

Further, the second granules allow reduction in weight of the formed solidified granular material because of their hollowness, resulting in a reduced weight of a vehicle when used for a frame member of the vehicle.

Furthermore, the bonding of the first granules and the second granules brought by the surface-melting of the second granules provides strong unification between the first granules and the second granules, allowing the formation of a large solidified granular material, and resulting in the application to various kinds of frame members of a vehicle.

Further, in addition to the above-described strong binding force between the first granules and the second granules, the hollow second granules can be collapsed when the vehicle frame member receives an impact, resulting in the efficient absorption of a large impact energy.

The charging of the mixture of the first granules and the second granules into the frame member may be performed with the mixture packed in a bag or a container.

The charging of the mixture packed in the bag or the container facilitates the handling of the mixture of the first granules and the second granules when the bag or the container is inserted into the frame member, increasing workability.

DETAILED DESCRIPTION OF THE INVENTION

Figure 1:
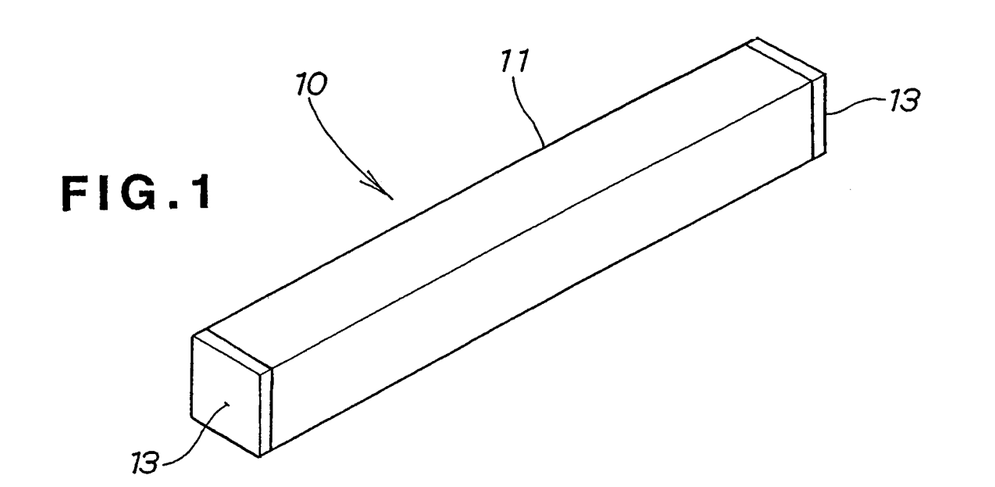
FIG. 1 is a perspective view illustrating a structural member having a frame member according to the present invention.

A structural member 10 shown in FIG. 1 corresponds to a member for forming a frame structure of a vehicle, for example. In a tubular frame or skeletal member 11, a solidified granular material 15 (see FIG. 2) with granules solidified is loaded. Reference numerals 13, 13 denote closing members for closing opposite ends of the tubular frame member 11.

Figure 2:
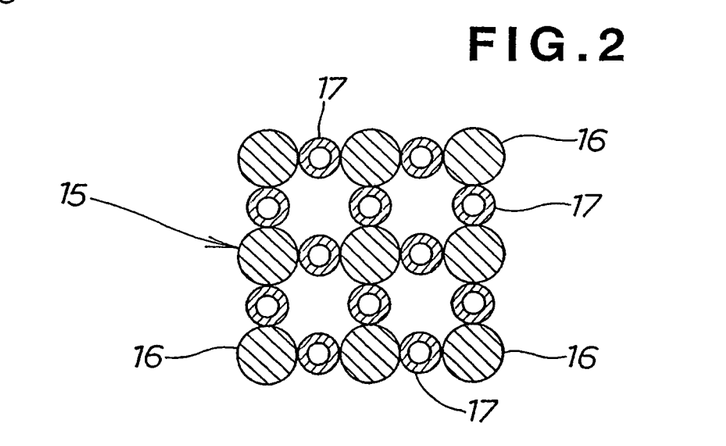
FIG. 2 is a cross-sectional view illustrating a solidified granular material filling the frame member shown in FIG. 1.

FIG. 2 illustrates the solidified granular material 15 loaded in the tubular frame member 11 shown in FIG. 1. The solidified granular material 15 consists of solid first granules 16 and hollow resin second granules 17 with which the granules 16 are bonded or combined. Although the first granules 16 and the second granules 17 are in reality bonded together tightly or with no space left therebetween, the bonding is loosely illustrated for convenience sake.

Figure 3:
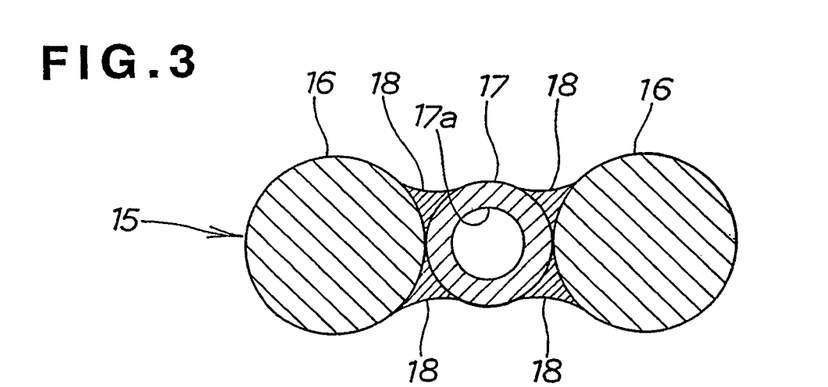
FIG. 3 is an enlarged view of the solidified granular material shown in FIG. 2.

As shown in FIG. 3, the solidified granular material 15 is a member with the adjacent first granules 16 bonded together by melting and then solidifying the surface of the second powder particle 17. Reference numeral 17a denotes a hollow portion of the second powder particle 17, and 18 denotes a solid portion made by the solidification of the second powder particle 17.

Figure 4A:
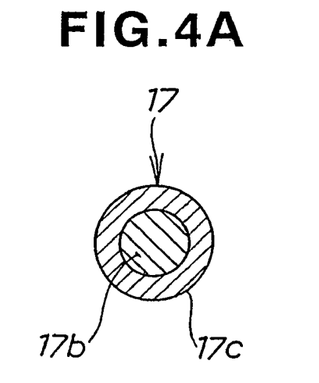
FIG. 4A is a cross-sectional view of a second powder particle before heating.

FIG. 4A illustrates the cross-section of a second powder particle 17 before expansion. The second powder particle 17 has a shell 17c made of thermoplastic resin such as a copolymer of polyvinyl chloride or a copolymer of acrylonitrile, enclosing a low-boiling hydrocarbon 17b. The hydrocarbon 17b may be a solid or a liquid, that is, may be in any form as long as it is able to be vaporized and expanded by heating. The hydrocarbon 17b has a low boiling point and is therefore practically preferred.

Figure 4B:
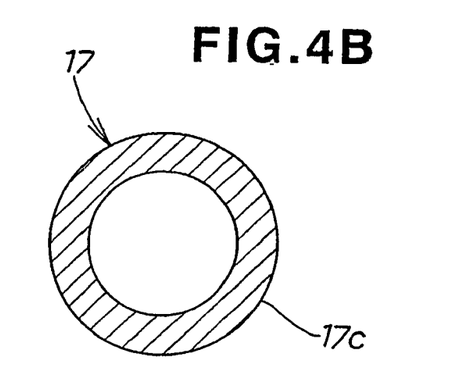
FIG. 4B is a cross-sectional view of the second powder particle, illustrating the expanded state after heating.

When the second powder particle 17 is heated, the hydrocarbon 17b shown in FIG. 4A evaporates upon reaching the boiling point as shown in FIG. 4B. With the internal pressure increased, the shell 17c is softened, and the shell 17c is expanded. With the temperature of the second powder particle 17 increased further, the surface of the shell 17c is melted.

Next, the formation of the above-described solidified granular material 15 will be described with reference to FIGS. 5A and 5B.

Figure 5A:
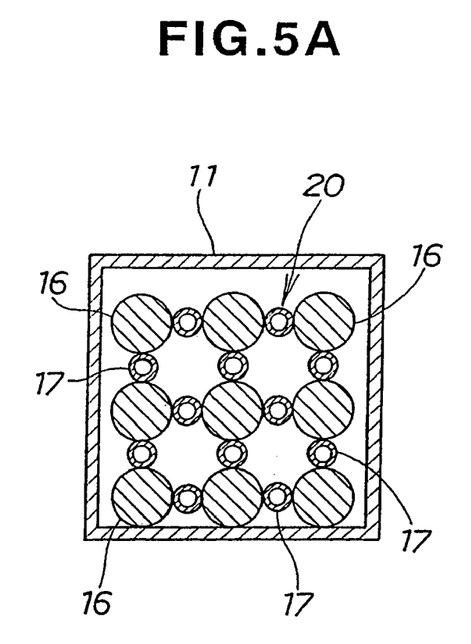
FIG. 5A is a cross-sectional view of a mixture of first granules and second granules charged into the frame member before heating.

As shown in FIG. 5A, the first granules 16 and the second granules 17 are mixed into a mixture 20. The mixture 20 is charged through an opening at one end of the frame member 11 shown in FIG. 1. Thereafter, the opening at the one end of the frame member 11 is closed with the closing member 13.

Figure 5B:
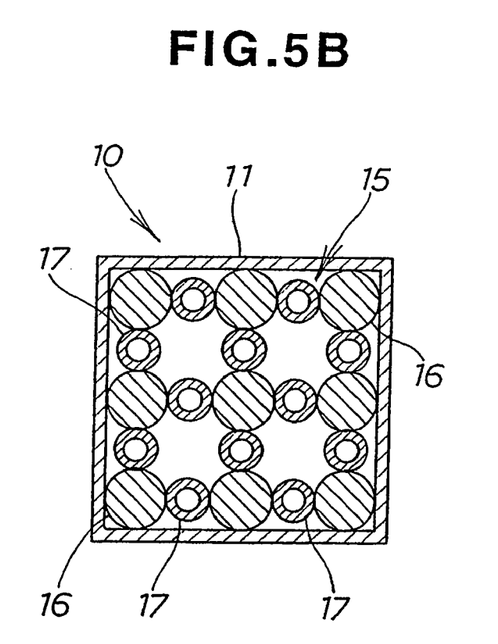
FIG. 5B is a cross-sectional view illustrating the expanded state of the second granules upon heating them together with the frame member.

Next, as shown in FIG. 5B, the second granules 17 are heated together with the frame member 11. By the heating, the second granules 17 expand and the surfaces of the second granules 17 melt, bonding with the first granules 16.

Thereafter, the frame member 11 is cooled to solidify the molten second granules 17, thereby to form the solidified granular material 15 filling the frame member 11 with no space therebetween.

Figure 6:
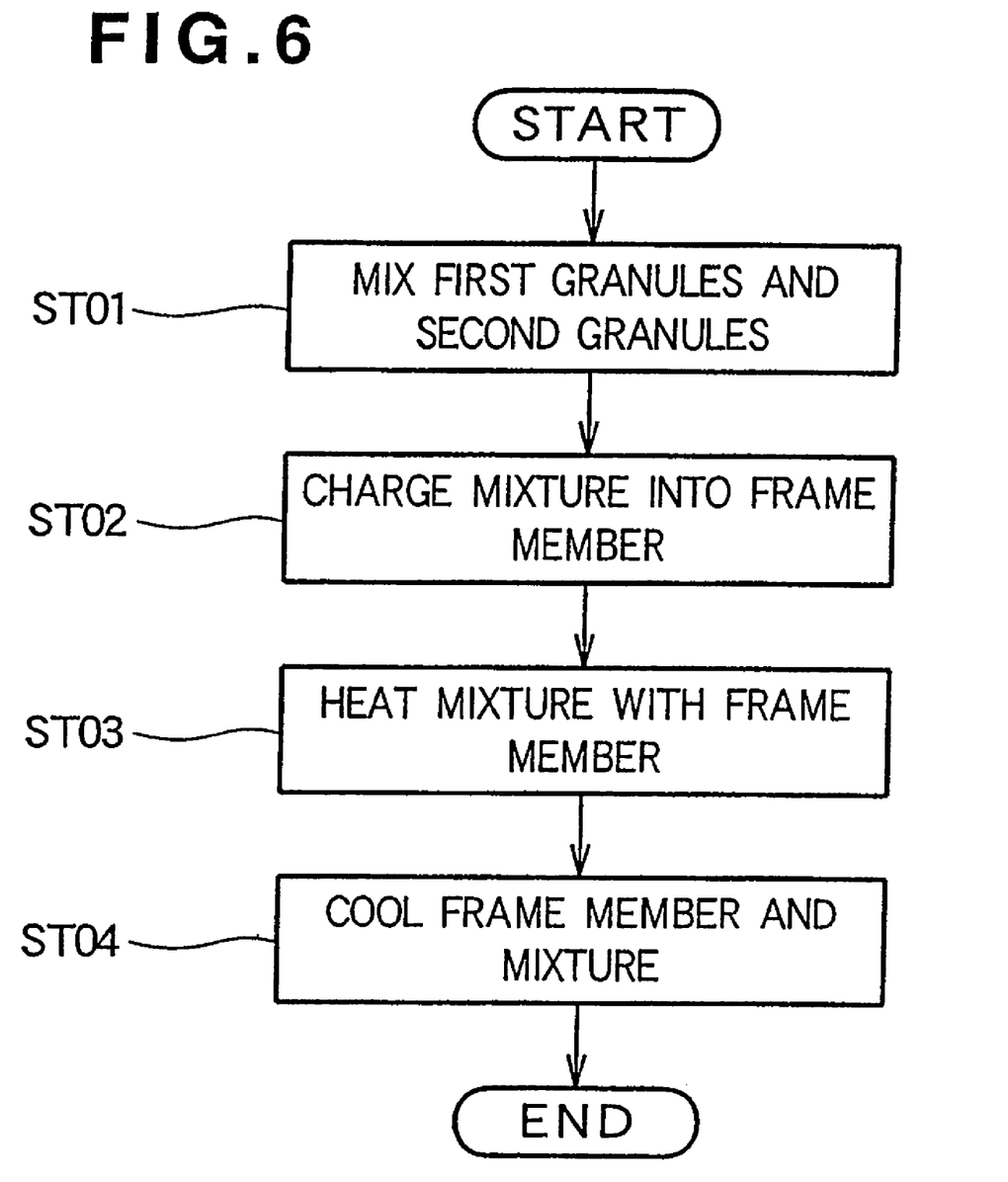
FIG. 6 is a flow diagram illustrating the steps in a method of forming the solidified granular material according to the present invention.

FIG. 6 is a flow diagram of a method of forming a solidified granular material according to the present invention, illustrating a method of forming the above-described solidified granular material.

Step (hereinafter abbreviated as ST) 01: First granules and second granules are mixed to provide a mixture of the first granules and the second granules.

ST02: The mixture is charged into a tubular frame member.

ST03: The mixture is heated together with the frame member to expand the second granules and melt their surfaces.

ST04: The frame member and the mixture are cooled to solidify the molten second granules, thereby to form a solidified granular material within the frame member.

Figure 7A:
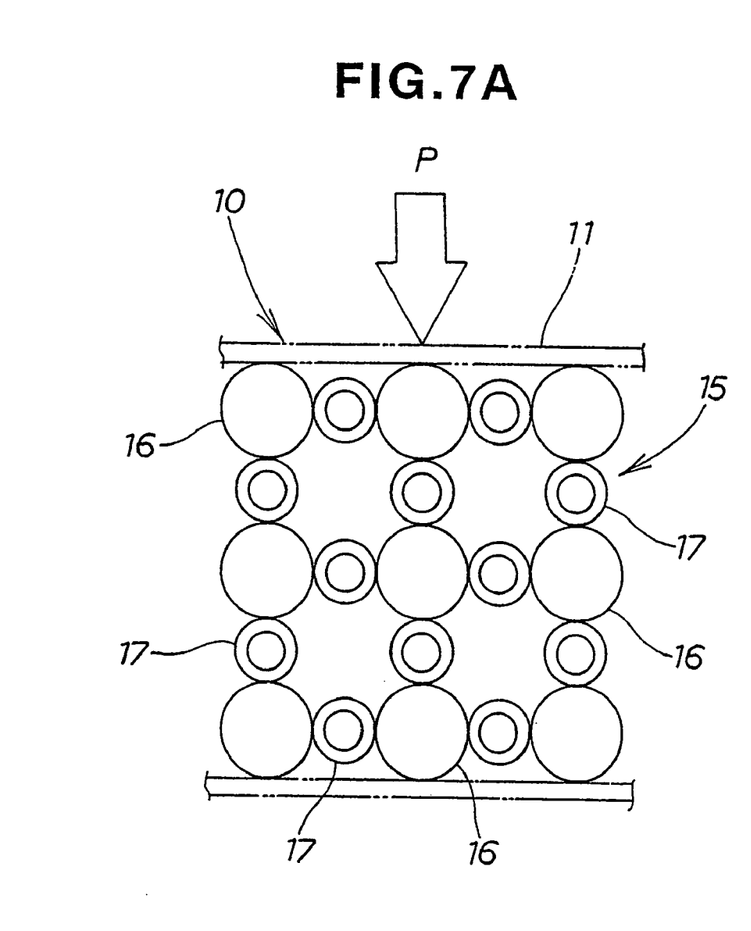
FIG. 7A is a diagram illustrating the application of load caused by an impact to the structural member with its frame member filled with the solidified granular material of the present invention.
Figure 7B:
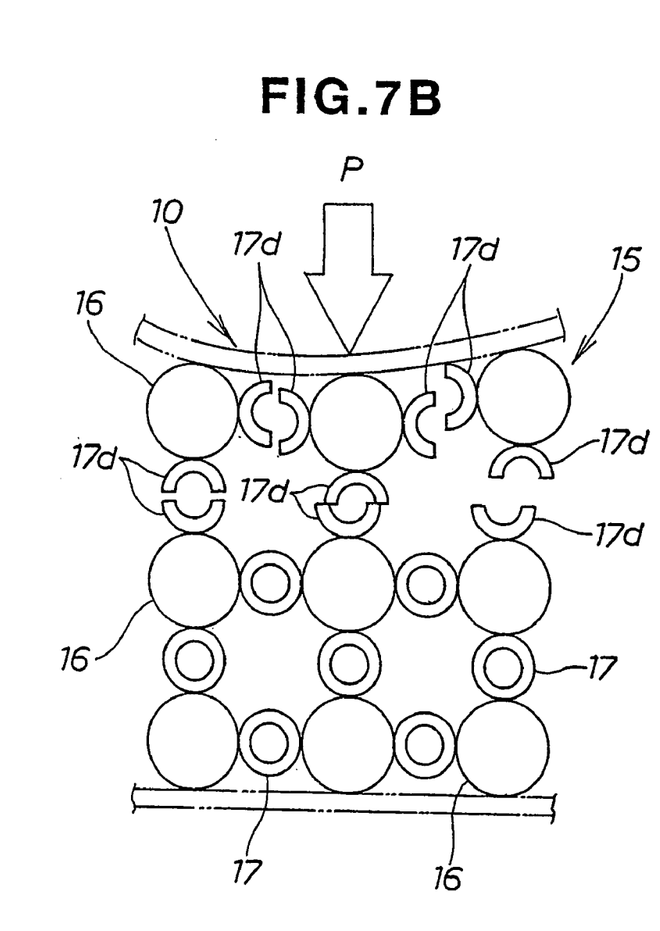
FIG. 7B is a diagram illustrating the deformation of the solidified granular material accompanying the deformation of the frame member due to the load.

FIGS. 7A and 7B illustrate the deformation of a frame member filled with the above-described powder material according to the present invention, upon the application of load to the frame member.

When, in FIG. 7A, load P acts on the structural member 10 from outside upon the collision of the vehicle, the load P acts on the solidified granular material 15 through the frame member 11, deforming the solidified granular material 15 as shown in FIG. 7B.

Specifically, in the early stages of deformation of the solidified granular material 15, the first granules 16 and the second granules 17 are slightly deformed. When the load P is further applied to the structural member 10, the hollow second granules 17 are deformed largely while the first granules 16 are hardly deformed, and the second granules 17 in the vicinity of a part of the structural member 10 directly subjected to the load P collapse. When the load P is further continuously applied, the collapse of the second granules 17 gradually shifts to a lower portion of the structural member 10.

Collapsed portions 17d formed by the collapse of the second granules 17 generate great frictional forces with the adjacent collapsed portions 17d and/or the adjacent first granules 16.

This frictional forces provide great resistance during the deformation of the solidified granular material 15, absorbing a greater impact energy upon collision. The gradual shift of the collapse of the second granules 17 allows the stable and efficient absorption of impact energy.

Next, although the first granules shown in FIGS. 2 and 3 have been described as being solid, a plurality of examples thereof shown in FIGS. 8A to 8G will be described as other examples.

Figure 8A:
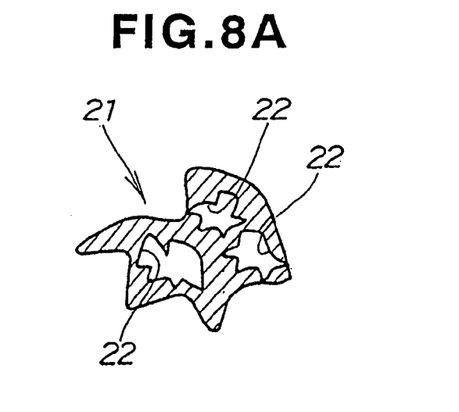
FIGS. 8A to 8G are cross-sectional views illustrating various examples of first granules for use in the present invention.

A first powder particle 21 in a first example shown in FIG. 8A has a porous body of indefinite shape having a plurality of holes 22 which are isolated from one another.

Figure 8B:
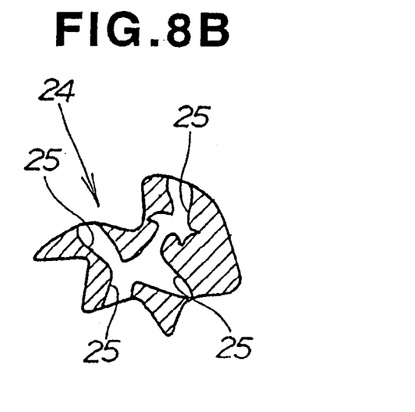

A first powder particle 24 in a second example shown in FIG. 8B has a porous body of indefinite shape having a plurality of holes 25 which communicate with one another.

Figure 8C:
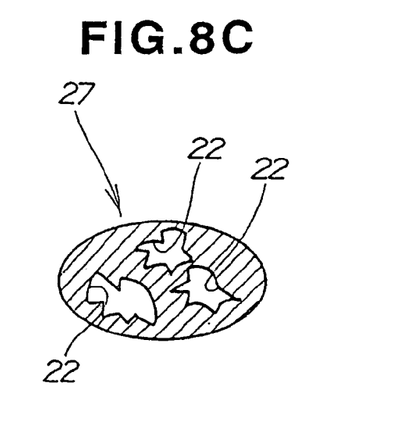

A first powder particle 27 in a third example shown in FIG. 8C has a porous body of definite shape having a plurality of holes 22 which are isolated from one another. The illustrated example shows an elliptical shape as an example.

Figure 8D:
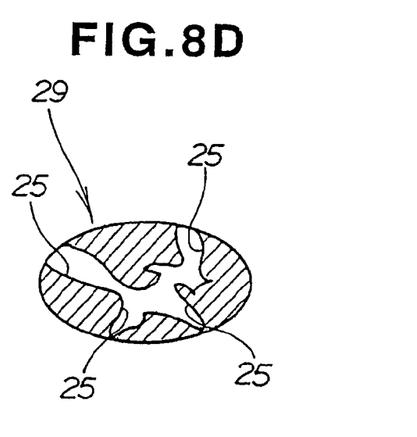

A first powder particle 29 in a fourth example shown in FIG. 8D has a porous body of definite shape having a plurality of holes 25 which communicate with one another. The illustrated example shows an elliptical shape as an example.

Figure 8E:
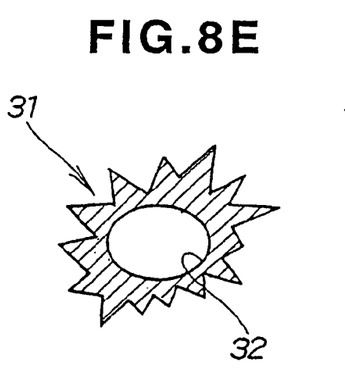

A first powder particle 31 in a fifth example shown in FIG. 8E has a star shape having a hollow portion 32.

Figure 8F:
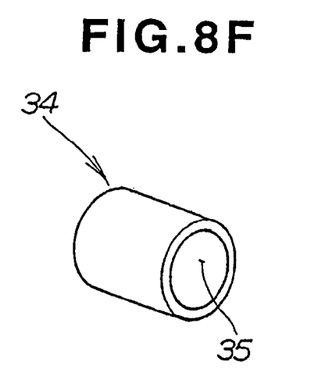

A first powder particle 34 in a sixth example shown in FIG. 8F is a pipe-shaped powder particle having a hollow portion 35.

Figure 8G:
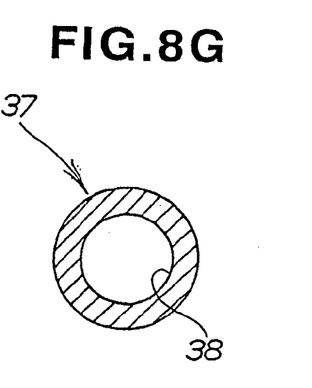

A first powder particle 37 in a seventh example shown in FIG. 8G is a spherical powder particle having a hollow portion 38.

The first granules 21, 24, 27 and 29 in the first to fourth examples as porous granules and the first granules 31, 34 and 37 in the fifth to seventh examples as hollow granules allow, together with the second granules 17 (see FIG. 2) for bonding them, further reduction in weight of structural members.

Figure 9A:
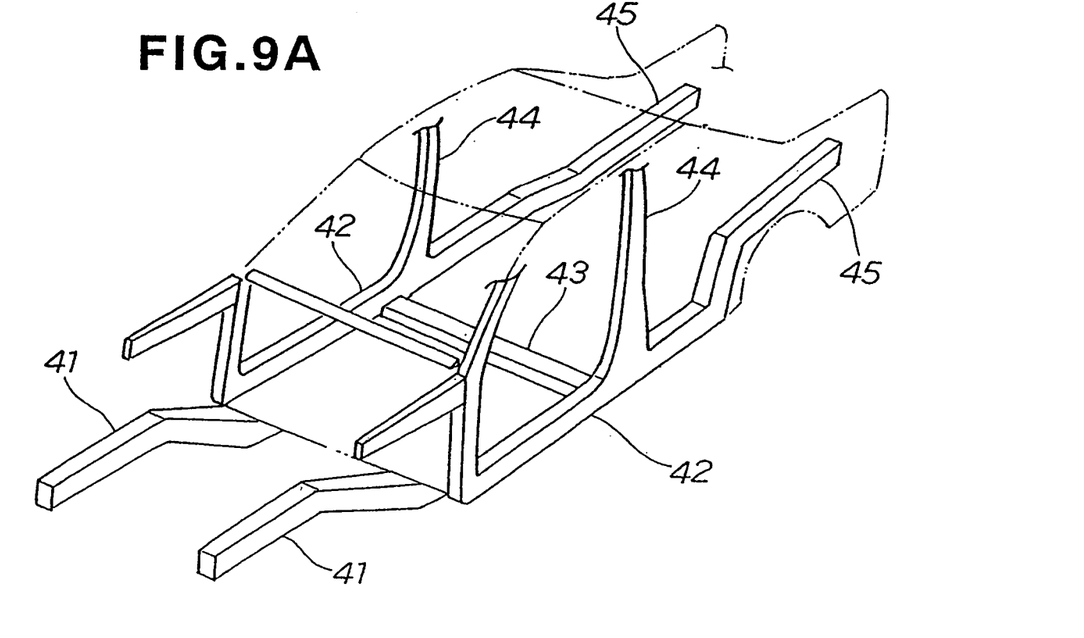
FIGS. 9A and 9B are perspective views of a frame constituting a vehicle body for which structural members according to the present invention are used.
Figure 9B:
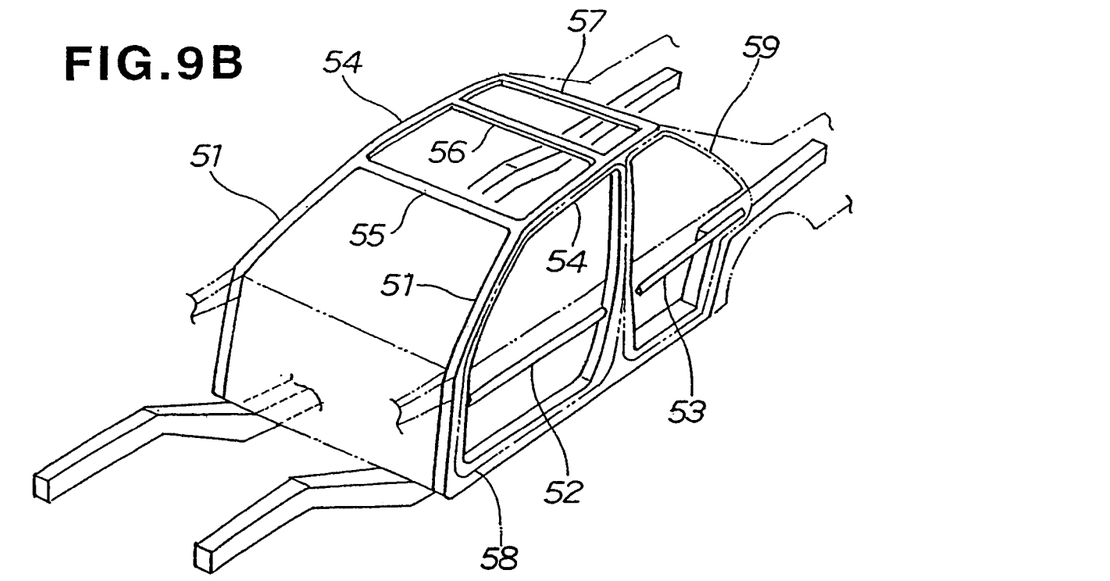

FIGS. 9A and 9B are perspective views of a frame constituting a vehicle body for which structural members according to the present invention are used.

As shown in FIG. 9A, structural members of the present invention are used for left and right front side frames 41, 41 arranged at lower portions on opposite sides of a vehicle front, left and right side sills 42, 42 arranged at lower portions on opposite sides of the vehicle body, a front floor crossmember 43 extended between the left and right side sills 42, 42, left and right B-pillars 44, 44 upraised from the left and right side sills 42, 42, and left and right rear frames 45, 45 extended rearward from the left and right side sills 42, 42.

Further, as shown in FIG. 9B, structural members of the present invention are used for left and right A-pillars 51, 51, side impact bars 52 and 53 respectively provided inside a front door 58 and inside a rear door 59, left and right roof side rails 54, 54 provided to constitute the opposite sides of the roof, and three roof rails 55, 56 and 57 extended between the left and right roof side rails 54, 54.

FIGS. 10A to 10D illustrate first to fourth examples of using a structural member of the present invention for a vehicle B-pillar.

Figure 10A:
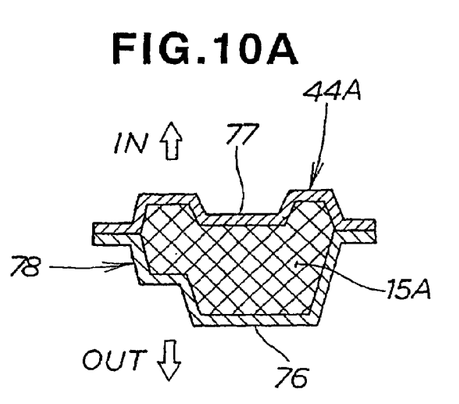
FIGS. 10A to 10D are diagrams illustrating a plurality of examples of using structural members according to the present invention for B-pillars shown in FIG. 10A.

A B-pillar 44A in the first example shown in FIG. 10A is an example of forming a frame member 78 with an outer panel 76 and an inner panel 77 disposed transversely inward of the outer panel 76 and filling the frame member 78 with a solidified granular material 15A.

Figure 10B:
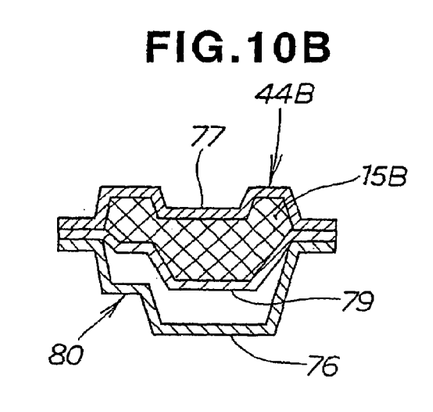

A B-pillar 44B in the second example shown in FIG. 10B is an example of forming a frame member 80 by mounting a reinforcing member 79 between an outer panel 76 and an inner panel 77 and filling a space between the reinforcing member 79 and the inner panel 77 with a solidified granular material 15B.

Figure 10C:
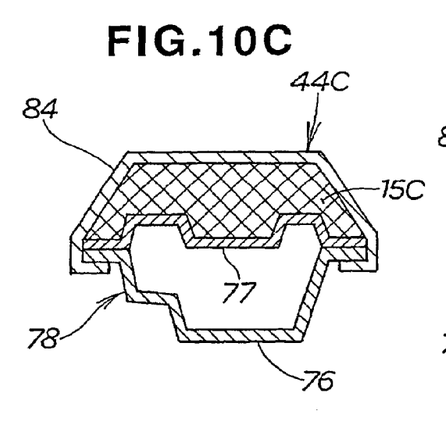

A B-pillar 44C in the third example shown in FIG. 10C is an example of mounting a B-pillar garnish 84 as a panel member transversely inward of a frame member 78 and filling a space between the B-pillar garnish 84 and the frame member 78 with a solidified granular material 15C.

Figure 10D:
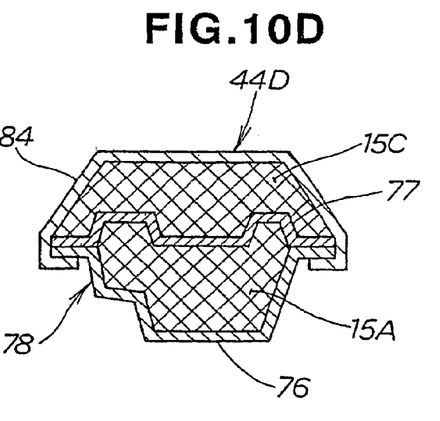

A B-pillar 44D in the fourth example shown in FIG. 10D is an example of mounting a B-pillar garnish 84 transversely inward of a frame member 78 and filling both a space inside the frame member 78 and a space between the B-pillar garnish 84 and the frame member 78 with solidified granular materials 15A and 15C, respectively.

As described above, the present invention is characterized in that, to form the solidified granular material 15A (or the solidified granular material 15C) with granules solidified in the space inside the frame member 78 and/or the space enclosed with the frame member 78 and the B-pillar garnish 84 as a surrounding panel member, the first granules 16 (see FIG. 5) and the second granules 17 (see FIG. 5) each having the thermoplastic resin shell 17c (see FIG. 4) which encloses a solid or liquid which expands by vaporization (e.g., the low-boiling hydrocarbon 17b (see FIG. 4)) are mixed and charged into the frame member 78, and the first granules 16 and the second granules 17 are heated together with the frame member 78 to soften and expand the second granules 17 by internal pressures and further to melt the surfaces of the second granules 17 for bonding with the first granules 16.

Since the solidified granular material 15A or 15C is formed with the second granules 17 expanded by heating, the frame member 78 can be filled with the solidified granular material 15A or 15C with no space therebetween.

Thus since only charging the first granules 16 and the second granules 17 into the frame member 78 and heating them allow the formation of the solidified granular material 15A or 15C, the solidified granular material 15A or 15C can be easily formed without the need for an additional production mold or an additional production step for independently forming a solidified granular material using a mold or the like for solidifying granules. Further, the fact that the surfaces of the second granules 17 can be melted at a low temperature eliminates the need for an additional heating apparatus or the like, increasing productivity.

Further, the second granules 17 allow reduction in weight of the formed solidified granular material 15 because of their hollowness, resulting in a reduced weight of a vehicle when used for a frame member of the vehicle.

Furthermore, the bonding of the first granules 16 and the second granules 17 brought by the surface-melting of the second granules 17 allows the formation of the large solidified granular material 15A or 15C with the first granules 16 and the second granules 17 strongly bonded, resulting in increased applications to parts of frame members of a vehicle.

Further, in addition to the above-described strong binding force between the first granules 16 and the second granules 17, the hollow second granules 17 can be collapsed when the frame member 11 receives impact as shown in FIG. 7B, resulting in the efficient absorption of a greater impact energy.

Next, a method of forming a solidified granular material according to a second embodiment of the preset invention will be described with reference to FIGS. 11A to 11D.

Figure 11A:
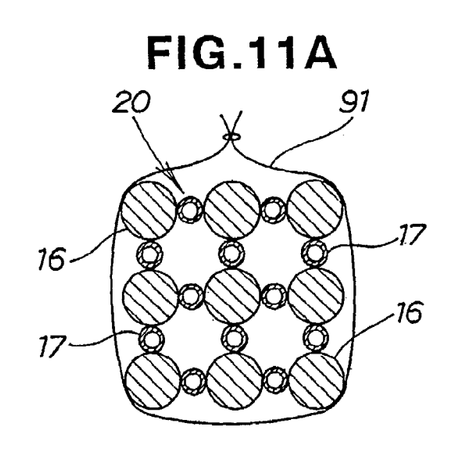
FIGS. 11A to 11D are cross-sectional views illustrating a method of forming a solidified granular material according to a second embodiment of the present invention.
Figure 11B:
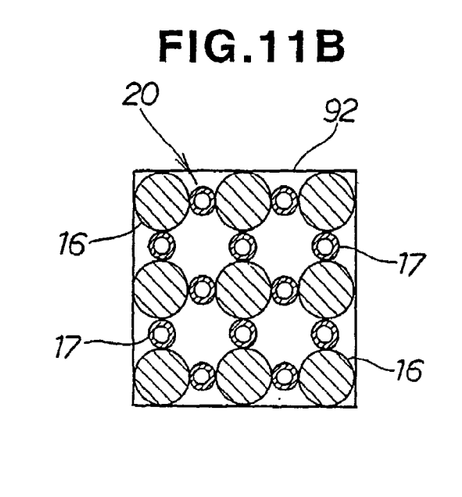

A mixture 20 of first granules 16 and second granules 17 is packed in a bag 91 as shown in FIG. 11A, or the mixture 20 is packed in a container 92 as shown in FIG. 11B. A material having the properties of expanding and melting by heating is used for the bag 91, but is not limiting. A material having the properties of easily breaking with the expansion of the second granules 17 may be used instead. Specifically, rubber, resin such as polyethylene, or paper, for example, is used as a preferable material. The container 92 may be any as long as it has similar properties to those of the bag 91.

Figure 11C:
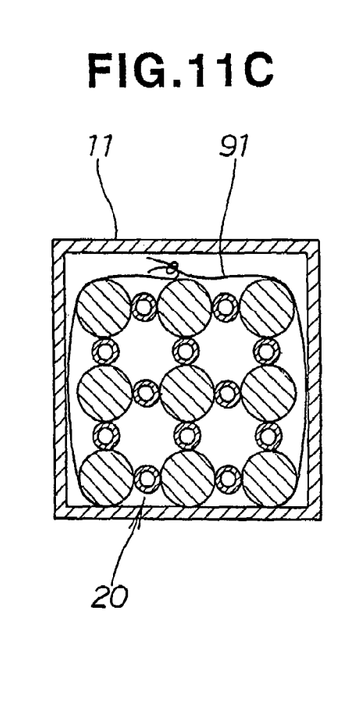

Next, as shown in FIG. 11C, the bag 91 (or the container 92) is inserted into a frame member 11. The mixture 20 is easily charged into the frame member 11 since packed in the bag 91 (or the container 92). That is, the bag 91 can be easily changed in its outer shape to the inner shape of the frame member 11. The container 92, when formed smaller in its outside dimension than the inside dimension of the frame member 11, can be easily inserted into the frame member 11.

Figure 11D:
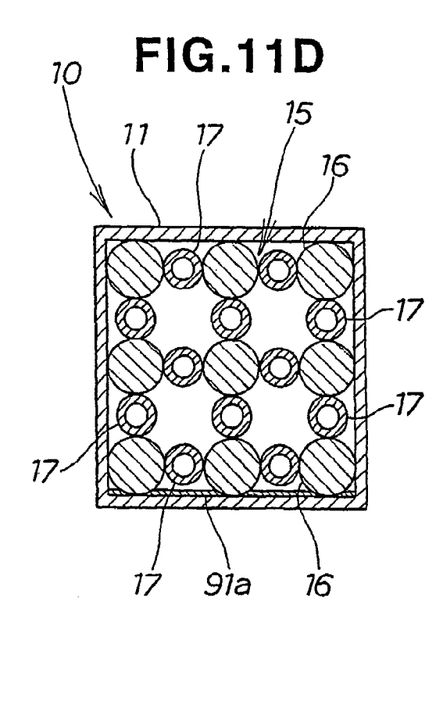

In FIG. 11D, the frame member 11 is heated. As a result, the second granules 17 are largely expanded, and further, the surfaces of the second granules 17 are melted and bonded with the first granules 16. At that time, the bag 91 expands with the expansion of the second granules 17 and melts by the heating.

Finally, the frame member 11 is cooled. As a result, a solidified granular material 15 is formed in the frame member 11 with little space therebetween. Reference numeral 91a denotes a solid matter made by melting and solidifying the bag 91.

Figure 12:
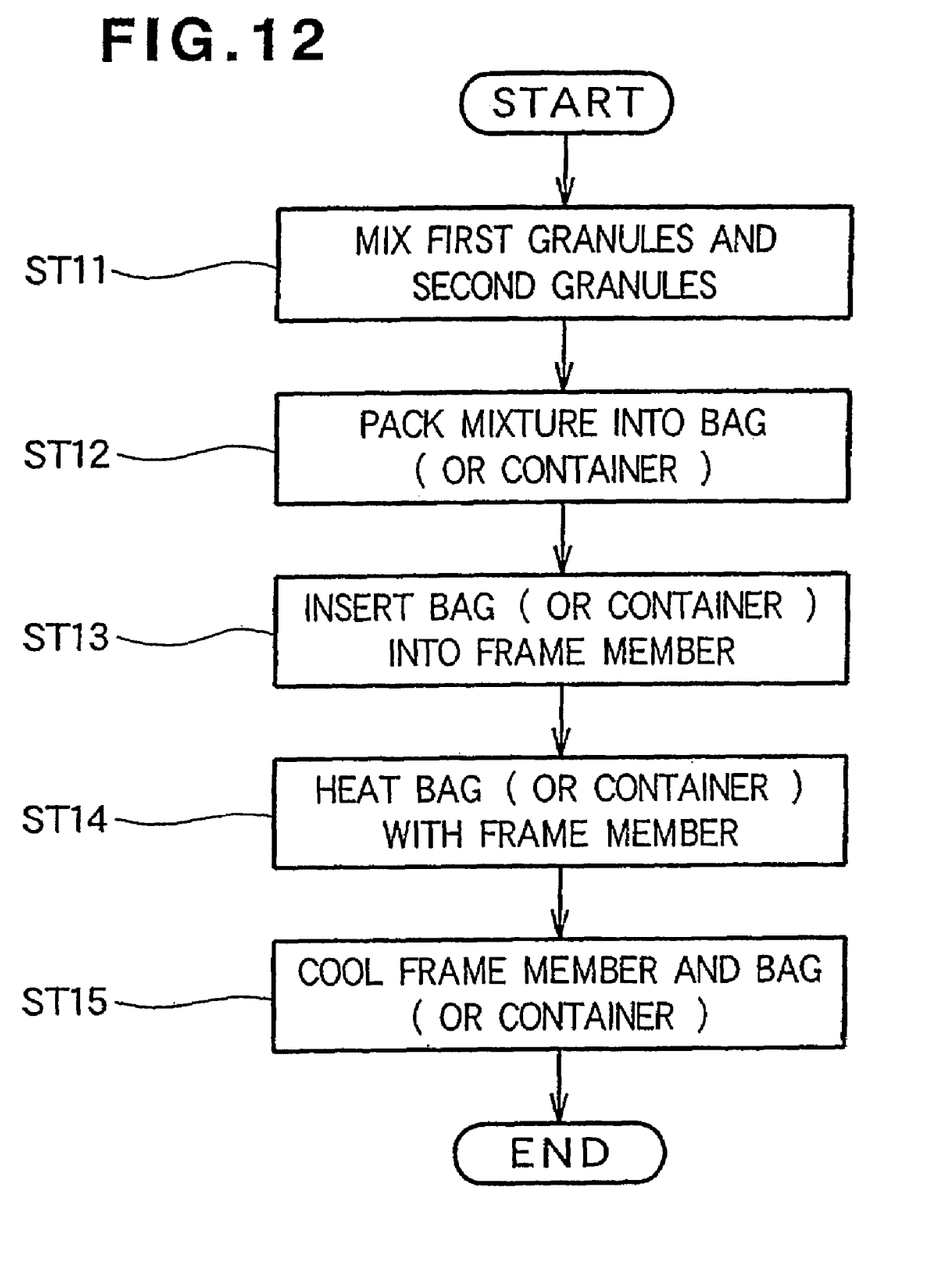
FIG. 12 is a flow diagram illustrating the steps in the method of forming the solidified granular material according to the second embodiment shown in FIGS. 11A to 11D.

FIG. 12 is a flow diagram illustrating the steps in a method of forming the solidified granular material according to the second embodiment shown in FIGS. 11A to 11D.

ST11: First granules are mixed with second granules to provide a mixture of the first granules and the second granules.

ST12: The mixture is packed in a bag (or container).

ST13: The bag (or container) is inserted into a frame member.

ST14: The bag (or container) is heated together with the frame member to expand the second granules and melt the surfaces thereof.

ST15: The frame member and the bag (or container) are cooled to solidify the molten second granules to form a solidified granular material.

As described above, the present invention is characterized in that the insertion of the mixture 20 of the first granules 16 and the second granules 17 into the frame member 11 is made with the mixture 20 packed in the bag 91 or the container 92.

The insertion of the mixture 20 packed in the bag 91 or the container 92 facilitates the handling of the mixture 20 of the first granules 16 and the second granules 17 when the bag 91 or the container 92 is inserted into the frame member 11, increasing workability.

First granules and second granules are not necessarily mixed before packed into a bag or a container, and may be mixed after packed in a bag or a container by shaking the bag or the container.

INDUSTRIAL APPLICABILITY

As described above, according to the present invention, a mixture of first granules and expandable second granules is charged into a frame member and heated to expand the second granules, forming a solidified granular material within the frame member. The frame member is thus filled with the solidified granular material with no space therebetween. A member such as an additional mold for forming a solidified granular material is thus not required, which results in reduced forming steps. These are advantageous especially in the production of automobile frame members as members for absorbing impact energy.

The invention claimed is:

1. A method for forming a solidified granular material (15) with granules bonded into a solid form, in a space within a frame member (11) and/or a space enclosed by said frame member and a surrounding panel member, said method comprising the steps of:

mixing first granules (16) and second granules (17) together, each of said second granules having a thermoplastic resin shell (17c) enclosing a solid or liquid (17b) which expands by vaporization;

charging the mixture of said first and second granules into said frame member;

heating said first granules and said second granules together with said frame member so as to soften said second granules and make the same expand by internal pressures and become hollow, as well as to melt surfaces of said second granules for bonding with said first granules; and cooling said first granules and said second granules together with said frame member to thereby provide the solid granular material comprised of said first granules and said second granules being more collapsible than said first granules.

2. A method as set forth in claim 1, wherein said solid or liquid (17b) which expands by vaporization comprises a hydrocarbon of low boiling point.

3. A method as set forth in claim 1, wherein said charging of the mixture (20) of said first granules and said second granules into said frame member (11) is performed with said mixture packed in a bag (91) or a container (92).

* * * * *